United States Patent [19]

Saitoh et al.

[11] 4,087,372

[45] May 2, 1978

[54] AN ABSORBING SOLUTION FOR THE REMOVAL OF NITROGEN OXIDE FORM A GAS CONTAINING SAME

[75] Inventors: Shigeru Saitoh; Tetsuya Watanabe; Koji Konno; Tadashi Nakamura, all of Iwaki, Japan

[73] Assignee: Kureha Kagaku Kogyo Kabushiki Kaisha, Tokyo, Japan

[21] Appl. No.: 651,422

[22] Filed: Jan. 22, 1976

Related U.S. Application Data

[62] Division of Ser. No. 517,370, Oct. 23, 1974, abandoned.

[30] Foreign Application Priority Data

| Oct. 31, 1973 | Japan | 48-122598 |
| Dec. 22, 1973 | Japan | 48-179 |
| Apr. 30, 1974 | Japan | 49-48549 |

[51] Int. Cl.$^2$ ............................................. B01D 53/54
[52] U.S. Cl. ....................................... 252/184; 55/68; 252/188.3 R; 423/235; 423/239; 423/242
[58] Field of Search ................... 252/184, 188.3 R; 423/235, 239, 242; 55/68

[56] References Cited

U.S. PATENT DOCUMENTS

| 3,923,954 | 2/1975 | Petrey et al. | 423/235 |
| 3,932,585 | 1/1976 | Moriguchi et al. | 423/235 |

FOREIGN PATENT DOCUMENTS

| 1,454,723 | 11/1965 | France | 423/235 |
| 1,251,900 | 10/1967 | Germany | 423/239 |

*Primary Examiner*—Benjamin R. Padgett
*Assistant Examiner*—Irwin Gluck
*Attorney, Agent, or Firm*—Tilton, Fallon, Lungmus & Chestnut

[57] ABSTRACT

Oxides of nitrogen can be removed efficiently from a gas containing such oxides of nitrogen by bringing said gas into contact with an aqueous solution containing an organic acid alkali salt and a salt of metal selected from the group consisting of Fe, Co, Ni, Cu and Mn in the presence of a sulfurous acid alkali salt. The efficiency for removing oxides of nitrogen is much improved by use of a polybasic acid alkali such as ethylenediamine tetracarboxylic acid alkali salt or nitrilo-tricarboxylic acid alkali salt as said organic acid alkali salt.

4 Claims, No Drawings

AN ABSORBING SOLUTION FOR THE REMOVAL OF NITROGEN OXIDE FORM A GAS CONTAINING SAME

Related Application

This is a divisional application of copending application Ser. No. 517,370, filed Oct. 23, 1974 now abandoned.

FIELD OF THE INVENTION

This invention relates to a method for efficiently removing oxides of nitrogen from a gas containing such oxides of nitrogen and, more particularly, to an absorbing solution for the removal of nitrogen oxide from such gas by bringing the gas into contact with an aqueous solution containing a preselected salt in the presence of a sulfurous acid alkali salt.

BACKGROUND OF THE INVENTION

Examples of gases containing oxides of nitrogen (hereinafter referred to as NO) are exhaust gases from combustion apparatuses such as boilers, nitric acid manufacturing plant, various metal treating processes and other nitrogen oxide generating plants.

In recent years, it is known that a so-called photochemical smog is generated frequently. One of the main causes of such photochemical smog is that a large quantity of NO is present in the atmosphere. It is therefore much expected to reduce the quantity of NO contained in such exhaust gases and/or to remove NO from such exhaust gases.

In combustion apparatuses such as boilers, for example, the NO content in the exhaust gas has been reduced conventionally by employment of the burners and furnaces of improved design. These methods, however, are not very desirable because they allow the reduction of NO only within narrow limits for both the theoretical and economical reasons.

From the thesis of J. W. Mellor ("A Comprehensive Treatise on Inorganic and Theoretical Chemistry," Vol. VIII, 1931, p.423 -) and thesis of B. F. G. Johnson and J. A. McCleverty ("Progress In Inorganic Chemistry," Vol. 7, 1966, p.277 -), it is known for long that salts of certain metals react with NO to form complexes. As is discussed by S. N. Gang and L. I. Mamon in "Journal of Applied Chemistry, U.S.S.R." 26, 1953, p.925 -, it is already known to absorb and remove NO by utilizing above-mentioned properties of metal salts.

A conventionally proposed method for removing NO from a gas containing NO is to bring said gas into contact with an aqueous solution containing said metal salts. Such method, however, is not very effective for removing $NO_x$ from a large quantity of exhaust smoke or exhaust gas. Because, even when a ferrous salt which, of all said metal salts, seems to have the highest ability of forming complexes with NO is employed, the gas/liquid contact has to be effected for a long time to remove NO which is present at a low concentration by reason that the NO absorption quantity per unit liquid quantity is extremely small.

Thus, any effective method for removing NO from a gas containing NO has not been proposed by now.

SUMMARY OF THE INVENTION

It is therefore an object of this invention to provide an effective method for removing NO from a gas containing NO.

This and other objects of this invention will become apparent from a reading of the following description.

The inventors supposed that in the above-described conventional technique if the velocity of dissolving NO into said aqueous solution as well as the reaction velocity of NO with said metal salt are increased sufficiently, then an effective removal of NO will be achieved. Based on such supposition, the inventors treated said gas in the presence of a sulfurous acid alkali salt with an aqueous solution containing an organic acid alkali salt and found that NO can be removed very efficiently from said gas. The inventors also found that NO contained in the gas can be removed more efficiently by use of a polybasic acid alkali such as ethylenediamine tetracarboxylic acid alkali salt and nitrilocarboxylic acid alkali salt as said organic acid alkali salt. The present invention was completed on the basis of such discoveries.

More specifically, the invention is characterized in that a gas containing NO is brought into contact with an aqueous solution containing an organic acid alkali salt and a salt of metal selected from a group consisting of Fe, Co, Ni, Cu and Mn in the presence of sulfurous acid alkali salt. The invention is also characterized by use of a polybasic acid alkali salt such as ethylenediamine tetracarboxylic acid alkali salt and nitrilotricarboxylic acid alkali salt as said organic acid alkali salt.

DETAILED DESCRIPTION OF THE INVENTION

The organic acid alkalis salt employed in this invention are water-soluble salts of organic acids, for example: salts obtained from the reaction of organic acids with alkali metals such as Li, Na and K; salts obtained from the reaction of organic acids with alkali salt earth metals such as Mg and Ca; ammonium salts of organic acids. These organic acids forming organic acid alkalis may be those which react with Fe, Co, Ni, Cu, and Mn to form water-soluble salts and include, for example: monobasic acids such as acetic acid, propionic acid and butyric acid; dibasic acids such as malonic acid and succinic acid; polybasic acids such as ethylenediamine tetracarboxylic acid and nitrilo-tricarboxilic acid. As the formic acid which contains only one carbon atom is easily decomposed, the organic acids containing two or more carbon atoms are preferred. These organic acids are weaker than sulfurous acid and stronger than $CO_2$. A typical example of said ethylenediamine tetracarboxylic acid is ethylenediamine tetraacetic acid (hereinafter referred to as EDTA) and a typical example of said nitrilo-tricarboxylic acid is nitril triacetic acid (hereinafter referred to as NTA). The carboxylic acids usable in forming ethylenediamine tetracarboxylic acids and nitrilo-tricarboxylic acids may be, for example, propionic acid, butylic acid or both of these acids. It should be understood, however, that the usable carboxylic acids are not limited only to these acids but other suitable acids may also be used.

The metal salts employed in this invention are water-soluble salts of metals selected from the group consisting of Fe, Co, Ni, Cu and Mn and include, for example: inorganic salts such as sulfates, chlorides, nitrates and thiocyanates; inorganic complex salts such as potassium ferrocyanide; salts prepared by the reaction of said metals with said organic acids.

According to this invention, the gas containing NO is brought into contact with an aqueous solution of said organic acid alkali salt and metal salt. In this process it is essential that a sulfurous acid alkali salt is present in said aqueous solution. Because, compared with NO a large quantity of oxygen is contained in the gas (for example, an exhaust gas from a combustion apparatus such as boiler normally contains oxygen at a concentration in the order of several %) and, unless a sulfurous acid alkali is present, the metal component of said metal salt dissolved in the aqueous solution will be oxidized and hence the NO-removing efficiency will be reduced within a short period of time. Such a reduction of NO-removing efficiency is most remarkable when Fe-salt which can collect NO most efficiently is being used. The presence of sulfurous acid alkali salt in the aqueous solution serves to restrain the oxidation of metal and therefore makes it possible to maintain the NO-removing efficiency at a high level. The sulfurous acid alkali salt is used in the form of $M_2SO_3$ or $MHSO_3$ (wherein, M represents alkalis similar to said organic acid alkalis). In case when the NO-containing gas is free from sulfur oxide (such as $SO_2$ and $SO_3$; hereinafter referred to as $SO_2$), a sulfurous acid alkali salt such as sodium sulfite, potassium sulfite, ammonium sulfite, sodium bisulfite, potassium bisulfite or ammonium bisulfite may be added into the aqueous solution. On the other hand, when the NO-containing gas also contains $SO_2$, the sulfurous acid alkali salt need not necessarily be added into the aqueous solution because the $SO_2$ is absorbed into the aqueous solution and reacted with the organic acid alkali salt present in the solution to form a sulfurous acid alkali salt within the aqueous solution. When removing NO by adding a sulfurous acid alkali salt into the aqueous solution, a liberated organic acid (which may be one of the organic acids similar to those employed in forming said organic acid alkali salts) may further be added into the aqueous solution to prevent the metal component of metal salt contained in the aqueous solution from being separated out in the form of water-insoluble salt such as hydroxide or oxide. When removing NO, although the entire portion of the organic acid alkali salt and metal salt contained in the aqueous solution need not be present in a dissolved state, it is preferred that a greater portion thereof are in a dissolved state.

The addition of a ferrous salt or cuprous salt into the aqueous solution makes it possible to remove NO at a higher efficiency compared with the addition of any other metal salt. In such ferrous salt and cuprous salt, however, the metallic valency is easily variable and therefore the ferrous salt or cuprous salt may be oxidized upon reduction of NO portion being absorbed in the aqueous solution into nitrous oxide ($N_2O$), which occurs as an increasingly larger quantity of NO is absorbed into the aqueous solution. The ferrous salt or cuprous salt is oxidized also by oxygen contained in the gas to form a water-insoluble metal salt, thereby reducing the absorption factor of NO into the aqueous solution. For example, in a system wherein an acetic acid alkali salt is present as the organic acid alkali salt, a trivalent Fe-salt is readily separated out at or near pH 5 seemingly in the form of $Fe(OH)(CH_3COOH)_2$. In this case, it is preferred that as the organic acid alkali salt a polybasic acid alkali such as, especially, ethylenediamine tetracarboxylic acid alkali or nitrilo-tricarboxylic acid alkali is added into the aqueous solution. Such polybasic acid alkali salts, which have an ability of forming chelates, react with a metal component of the metal salt contained in the aqueous solution to form a stable chelate compound and thus protect said metal component sufficiently, so that no danger of an insoluble metal salt being produced is encountered. In the event when a polybasic acid alkali salt of said type is used, in place of a ferrous salt, for example, a ferric salt may also be added into the aqueous solution as said metal salt. The ferric salt, which is present in the aqueous solution in the form of chelate compound, is then reduced by a sulfurous acid alkali salt into a ferrous salt but not into a water-insoluble metal salt. Also, a polybasic acid alkali salt of said type and one of the previously mentioned other organic acid alkali salts may be applied simultaneously as said organic acid alkali salt.

According to the method of this invention, to remove NO from a NO-containing gas, the gas is brought into contact with an aqueous solution containing an organic acid alkali salt and a salt of metal selected from a group consisting of Fe, Co, Ni Cu and Mn in the presence of a sulfurous acid alkali salt. In this process it is preferred that the aqueous solution has a temperature in the range of 20° – 90° C and, although not critical, a pH in the range of 4 – 7. 0.06 mol/l or more concentration of organic acid alkali salt and 0.003 mol/l or more concentration of metal salt in said aqueous solution may be enough. However, each of these concentrations should preferably be less than the solubility of the organic acid alkali salt or the metal salt at the NO-absorbing temperatures (20° – 90° C) of the aqueous solution. It is especially preferred to add 0.06 – 3.6 mol/l of organic acid alkali salt, 0.003 – 1.2 mol/l of metal salt and 0.008 – 1.2 mol/l of sulfurous acid alkali salt into the aqueous solution. It is also preferred that, depending on the actual need, 0.01 – 2.4 mol/l of free organic acid is added into the aqueous solution as mentioned previously. For example, an aqueous solution containing 1.2 mol/l of sodium acetate, 0.14 mol/l of ferrous sulfate and 0.15 mol/l of sodium sulfite or an aqueous solution containing 0.16 mol/l of ethylenediamine tetrasodium acetate, 0.14 mol/ of ferrous sulfate and 0.15 mol/l of sodium sulfite may be employed.

With the method of this invention, it is possible to effectively remove NO from a gas containing NO and, in case when the gas also containing $SO_2$ (for example, a heavy oil combustion gas from a combustion apparatus such as boiler contains not only NO but also $SO_2$), $SO_2$ can be removed together with $NO_x$. As mentioned previously, since the organic acid which forms the organic acid alkali is weaker than $SO_2$ but stronger than $CO_2$, there is no danger encountered that $CO_2$ present in the gas prevents the removal of $SO_2$. The method of this invention, which is effective to remove both NO and $SO_2$, is extremely useful for treating the exhaust gas.

While the invention will be described hereinunder with reference to several Examples, it should be understood that the invention is not limited to those Examples only. In the following Reference Example and Examples, a naphthyl ethylenediamine process is employed as a method for analyzing NO contained in the gas. In this process, however, nitrous oxide present in the gas cannot be measured and therefore, even when the NO which has once been absorbed into the absorption liquid is again intermingled into the gas as nitrous oxide, the NO is considered to have been absorbed. As is seen from Example 12, with the method of this invention the NO which has once been absorbed is converted into nitrous oxide in an extremely small quantity, so that the absorption factor obtained by this analyzing method may be considered to be a NO-removing factor. (In the Reference Example, nitrous oxide develops in a large quantity and the NO-removing factor is not coincident with the absorption factor.)

In the following Reference Example and Examples, the percentage of gaseous substances such as NO, $NO_2$, $O_2$, etc. will be expressed by volume %, whereas the percentage of non-gaseous substances such as sodium acetate, ferrous sulfate, etc. will be expressed by wt %.

REFERENCE EXAMPLE

This Example shows the NO-absorption effects achieved by use of various combinations of organic acid alkali salt and metal salt.

Two separate scrubbing bottles each with a glass filter (each bottle having an inner diameter of approx. 5 cm and a height of approx. 15 cm) were serially connected together. In every experiment, 200 ml of water was introduced into the first bottle and 200 ml of an absorbing liquid selected from those having compositions as listed in Tables 1a and 1b was introduced into the second bottle, and these bottles were maintained at 55° C. A gas sampling port $S_1$ was arranged between the first and second bottles, a second gas sampling port $S_2$ was arranged at the outlet of second bottle. At the inlet of first bottle a NO-containing gas was introduced at a rate of 38 l/h to effect a NO absorption process.

As the NO-containing gas, a mixed gas containing 350 ppm of NO (NO, 90%; $NO_2$, 10%) and the balance of nitrogen gas and another mixed gas containing 350 ppm of NO, 5% of oxygen and the balance of nitrogen gas were used.

A NO analysis was effected in accordance with JIS K0104 (1968) (naphtyl ethylenediamine process) and the NO absorption factor was calculated in accordance with the following formula:

NO absorption factor (%) = $(S_1 - S_2)/S_1 \times 100$ (where, $S_1$: NO concentration before absorption, $S_2$: NO concentration after absorption)

TABLE 1 (a)

When the gas containing no oxygen.

| | NO absorption factor (%) | | |
|---|---|---|---|
| Composition of absorbing liquid | after 5 minutes | after 30 minutes | after 60 minutes |
| 10% sodium acetate 2% ferrous sulfate | — | — | 97 |
| 10% sodium acetate 2% ferrous chloride | — | — | 98 |
| 10% calcium acetate 2% ferrous chloride | — | — | 97 |
| 10% sodium propionate 2% ferrous sulfate | — | — | 87 |
| 10% sodium acetate 2% cuprous chloride | — | — | 76 |

TABLE 1 (b)

When the gas containing oxygen.

| | NO absorption factor (%) | | |
|---|---|---|---|
| Composition of absorbing liquid | after 5 minutes | after 30 minutes | after 60 minutes |
| 10% sodium acetate 2% ferrous sulfate | 58 | 21 | 0 |
| 10% sodium acetate 2% ferrous chloride | 62 | 32 | 7 |
| 10% calcium acetate 2% ferrous chloride | 43 | 16 | 0 |
| 10% sodium propionate 2% ferrous sulfate | 38 | 6 | 0 |
| 10% sodium acetate 2% cuprous chloride | 35 | 7 | 0 |

EXAMPLE 1

Two separate scrubbing bottles each with a glass filter (each bottle having an inner diameter of approx. 5 cm and a height of approx. 17 cm) were serially connected together. In every experiment, 200 ml of water was introduced into the first bottle and 200 ml of an absorbing liquid selected from those having compositions as listed in Table 2 was introduced into the second bottle, and these bottles were maintained at a constant temperature within a thermostatic vessel. A gas sampling port $S_1$ was arranged between the first and second bottles, a second gas sampling port $S_2$ was arranged at the outlet of second bottle and at the inlet of first bottle a mixed gas consisting of 350 ppm of NO (NO, 90%; $NO_2$, 10%), 5% of oxygen and the balance of nitrogen was introduced at a rate of 40 l/h to effect a NO absorption process.

The NO analysis was effected in the similar manner to Reference Example to obtain a NO absorption factor.

TABLE 2

| Composition of absorbing liquid | Absorbing temperature (° C) | NO absorption factor (%) after 60 min. |
|---|---|---|
| 10% sodium acetate 2% ferrous sulfate 3% sodium sulfite | 55 | 92 |
| 10% sodium acetate 2% ferrous sulfate 2% sodium sulfite | 80 | 93 |
| 10% potassium acetate 2% ferrous sulfate 3% potassium sulfite | 55 | 89 |
| 10% ammonium acetate 2% ferrous sulfate 3% ammonium sulfite | 30 | 88 |
| 10% sodium propionate 2% ferrous chloride 3% sodium sulfite | 55 | 92 |
| 10% sodium acetate 2% cobalt sulfate 3% sodium bi-sulfite | 55 | 76 |
| 10% sodium acetate 2% nickel sulfate 3% sodium sulfite | 55 | 72 |
| 10% potassium acetate 2% copper sulfate 3% potassium bi-sulfite | 55 | 88 |
| 10% sodium acetate 2% maganium sulfate 3% sodium sulfite | 55 | 73 |
| 10% magnesium acetate 2% ferrous sulfate 2% magnesium sulfite | 55 | 79 |

EXAMPLE 2

A 55° C aqueous solution containing 4.9% of ethylenediamine-disodium-tetraacetate.$2H_2O$, 2% of ferrous sulfate and 2.2% of sodium sulfite and adjusted to pH 5.3 with caustic soda was used as the absorbing liquid and in a similar manner to Example 1 a nitrogen gas containing approx. 330 ppm of nitrogen oxide and 5% of oxygen was scrubbed at a rate of 100 l/h. The nitrogen oxide absorption factor after 1 hour was 95%.

EXAMPLE 3

A 55° C aqueous solution containing 4.9% of ethylenediamine-disodium-tetraacetate.$2H_2O$, 2% of ferrous sulfate, 2.2% of sodium sulfite, 10% of sodium acetate and 2.4% of acetic acid and adjusted to pH 5.3 was used as the absorbing liquid and in a similar manner to Example 1 a nitrogen gas containing approx. 300 ppm of nitrogen oxide and 5% of oxygen was scrubbed at a rate of 100 l/h. The nitrogen oxide absorption factor after 1 hour was 90%.

EXAMPLE 4

A 55° C aqueous solution containing 4.9% of ethylenediamine-disodium-tetraacetate.2H$_2$O, 2% of ferric sulfate, 4.4% of sodium sulfite, 10% of sodium acetate and 2.4% of acetic acid and adjusted to pH 5.3 was used as the absorbing liquid and in a similar manner to Example 1 a nitrogen gas containing approx. 300 ppm of nitrogen oxide and 5% of oxygen gas was scrubbed at a rate of 100 l/h. The nitrogen oxide absorption factor after 2 hours was 88%.

EXAMPLE 5

A nitrogen oxide absorption was effected in a manner which is just similar to Example 3 excepting that the absorbing liquid contains, in place of ethylenediamine-disodium-tetraacetate.2H$_2$O, 5.1% of nitrilo-trisodium-triacetate.H$_2$O. The absorption factor after 70 minutes was 70%.

EXAMPLE 6

An aqueous solution containing 10% of sodium acetate, 3% of ferrous sulfate and 3% sodium sulfite and maintained at 55° C was used as the absorbing liquid, and in a similar manner to Example 1 a mixed gas consisting of 350 ppm of NO (NO, 90%; NO$_2$, 10%), 870 ppm of SO$_2$, 5% of oxygen and the balance of nitrogen gas was scrubbed at a rate of 38 l/h to effect a NO absorption. In this process, not only NO but also SO$_2$ was absorbed. The NO absorption factor was 97% and SO$_2$ absorption factor was 99%.

A SO$_2$ analysis was effected by an iodine process after absorbing SO$_2$ into a 5% NaOH aqueous solution. The SO$_2$ absorption factor was also calculated in a similar manner to the NO absorption factor.

EXAMPLE 7

A NO and SO$_2$ absorption was effected in a manner which is just similar to Example 6 excepting that an aqueous solution containing 10% of sodium propionate, 3% of ferrous sulfate and 3% of sodium sulfite was employed. The NO absorption factor was 89% and SO$_2$ absorption factor was 99%.

EXAMPLE 8

As the absorbing liquid 200 ml of 15% sodium acetate aqueous solution was placed in the apparatus of Example 1 and then a nitrogen gas containing 1,500 ppm of SO$_2$ was scrubbed for 10 hours at a rate of 50 l/h. The absorbing liquid was proved to contain 2% of sodium sulfite. To this absorbing liquid was added 2% of ferrous sulfate and in a similar manner to Example 7 a mixed gas containing 350 ppm of NO (NO, 90%; NO$_2$, 10%), 870 ppm of SO$_2$, 5% of oxygen and the balance of nitrogen gas was scrubbed at a rate to 38 l/h to effect a NO and SO$_2$ absorption. The NO absorption factor was 97% and SO$_2$ absorption factor was 99%.

EXAMPLE 9

The experiment of Example 7 was repeated with ferrous sulfate replaced by any other metal salt listed in Table 3. The absorption factors for NO and SO$_2$ were as listed in Table 3.

TABLE 3

| Metal salt added | NO absorption factor (%) | SO$_2$ absorption factor (%) |
|---|---|---|
| Cobalt sulfate | 73 | 99 |
| Nickel sulfate | 72 | " |
| Cupric sulfate | 89 | " |
| Manganium sulfate | 87 | " |
| Cuprous chloride | 87 | " |
| Cupric chloride | 88 | " |
| Ferrous chloride | 96 | " |
| Ferrous nitrate | 98 | " |
| Ferrous acetate | 97 | " |

EXAMPLE 10

A NO and SO$_2$ absorption was effected in a manner and under conditions which are similar to Example 6 excepting that the concentration of ferrous sulfate was varied. The results were as listed in Table 4.

TABLE 4

| Concentration of ferrous sulfate (%) | NO absorption factor (%) | SO$_2$ absorption factor (%) |
|---|---|---|
| 0.05 | 79 | 99 |
| 0.1 | 91 | " |
| 0.5 | 98 | " |
| 3 | 98 | " |
| 10 | 99 | " |

EXAMPLE 11

A NO and SO$_2$ absorption was effected in a manner and under conditions which are just similar to those of Example 6 excepting that the concentration of sodium acetate was varied. The results were as listed in Table 5.

TABLE 5

| Concentration of sodium | NO absorption factor (%) | SO$_2$ absorption factor (%) |
|---|---|---|
| 0.5 | 68 | 95 |
| 2 | 88 | 99 |
| 5 | 93 | " |
| 15 | 98 | " |
| 20 | 98 | " |

EXAMPLE 12

In just a similar manner to Example 6, a mixed gas containing 350 ppm of NO (NO, 90%; NO$_2$, 10%), 5% of oxygen and the balance of nitrogen gas was scrubbed at a rate of 40 l/h to effect a NO absorption. The NO absorption factor was measured by the method similar to that of Example 1 and the presence of nitrous oxide in the treated gas was checked by use of a gas chromatography.

In the case when an aqueous solution containing 10% of sodium acetate and 2% of ferrous sulfate was used as the absorbing liquid, the NO absorption factor after 30 minutes was 21% and 16% of the absorbed NO was converted into nitrous oxide.

In the case when an aqueous solution containing 10% of sodium acetate, 2% of ferrous sulfate and 2% of sodium sulfite was used as the absorbing liquid. The NO absorption factor after 60 minutes was 92% and only less than 1% of the absorbed NO was converted into nitrous oxide.

EXAMPLE 13

200 ml of absorbing liquid was introduced into an absobin bottle attached with a glass filter and a gas containing oxygen and a slight quantity of nitrogen oxide was scrubbed for absorbing the nitrogen oxide.

The absorbing liquid was an aqueous solution containing 2% of ferrous sulfate, 4.9% of EDTA (disodium.2H$_2$O) and 2.2% of sodium sulfite and adjusted to pH 5.3 with caustic soda. The absorbing bottle was disposed in a hot-water bath to maintain at 55° C. A nitrogen gas containing approx. 330 ppm to nitrogen oxide and 5% of oxygen was passed through the bottle at a rate of 100 l/h. The nitrogen oxide absorption factor after 1 hour was 95.2%.

EXAMPLE 14

A gas containing oxygen and a slight quantity of nitrogen oxide was scrubbed in a manner similar to Example 13 for absorbing the nitrogen oxide. The absorbing liquid was an aqueous solution containing 2% of ferrous sulfate, 4.9% of EDTA (disodium.2H$_2$O), 2.2% of sodium sulfite, 10% of sodium acetate and 2.4% of acetic acid and adjusted to pH 5.3. Of these components, sodium acetate and acetic acid were added to the aqueous solution for adjusting its pH.

A nitrogen gas containing approx. 300 ppm of nitrogen oxide and 5% of oxygen was scrubbed through said aqueous solution at a rate of 100 l/h. The nitrogen oxide absorption factor after 1 hour was 90.4%.

EXAMPLE 15

As the absorbing liquids 200 ml of aqueous solution, which had a composition similar to that of Example 14 excepting that, in place of ferrous sulfate, 2% of ferric sulfate and 4.4% of sodium sulfite were contained, was used and a nitrogen oxide absorption was effected in a manner similar to Example 13. The absorption factor after 2 hours was 86%.

EXAMPLE 16

As the absorbing liquid, 200 ml of aqueous solution, which had a composition similar to that of Example 14 excepting that, in place of EDTA, 5.1% of NTA (trisodium.H$_2$O) was contained, was used and a nitrogen oxide absorption was effected in a manner similar to Example 1. The absorption factor after 70 minutes was 70%.

EXAMPLE 17

Five separate scrubbing bottles each with a glass filter (each bottle having an inner diameter of approx. 5 cm and a height of approx. 17 cm) were serially connected together. 200 ml of water was introduced into the first bottle and 200 ml of an absorbing liquid containing 10% of sodium acetate, 3% of ferrous sulfate, 2.5% of acetic acid, 3.1% of sodium sulfate and 3.0% of sodium sulfite was introduced into each of the second to fifth bottles. The bottles were disposed in a thermostatic vessel set to a preselected temperature.

A gas sampling port S$_1$ was arranged between the first and second bottles and another gas sampling port S$_2$ was arranged at the outlet of the fifth bottle. The NO analysis was effected in accordance with the naphtyl ethylenediamine process, JIS K0104 (1968). Only SO$_2$ was analyzed by the iodine process after having been absorbed in a 5% NaOH solution.

The absorption factors for NO and SO$_2$ were calculated in accordance with the following formula:

$$\text{NO, SO}_2 \text{ absorption factor (\%)} = \frac{\text{Concentration before absorption} - \text{Concentration after absorption}}{\text{Concentration before absorption}} \times 1$$

In this formula, the concentrations of NO and SO$_2$ measured at S$_1$ are regarded to be their concentrations before absorption and the concentrations of NO and SO$_2$ measured at S$_2$ are regarded to be their concentrations after having been absorbed.

Absorbing temperature: 55° C
Composition of gas:
NO, 350 ppm (NO$_2$; 10%, NO; 90%)
SO$_2$, 870 ppm
Nitrogen, the balance
Gas flow rate: 38 l/h The NO-and SO$_2$-removing factors varied with time as follows:

|  | after 5 min. | after 30 min. | after 60 min. |
|---|---|---|---|
| NO-removing factor (%) | 97 | 98 | 98 |
| SO$_2$-removing factor (%) | >99 | 97 | 95 |

EXAMPLE 18

Two separate scrubbing bottles each with a glass filter (each bottle having an inner diameter of approx. 5 cm and a height of approx. 17 cm) were serially connected together. In each experiment, 200 ml of water was introduced into the first bottle and 200 ml of a selected absorbing liquid was introduced into the second bottle, and these bottles were disposed into a thermostatic vessel set to a predetermined temperature. A gas sampling port S$_1$ was arranged between the first and second bottles and another gas sampling port S$_2$ was arranged at the outlet of second bottle. The analyses were all effected in accordance with JIS K0104 (1968) (naphthyl ethylenediamine process) and the NO-removing factor was calculated in accordance with the following formula:

$$\text{NO-removing factor (\%)} = \frac{\text{NO concentration before absorption} - \text{NO concentration after absorption}}{\text{NO concentration before absorption}} \times 100$$

In this formula, the NO concentration before absorption is a value measured at S$_1$ and NO concentration after absorption is a value measured at S$_2$. The absorbing conditions were as follows:

Absorbing temperature: 55° C
NO$_x$ concentration: 350 ppm (NO$_2$, 10%, NO; 90%)
O$_2$ concentration: 5%
Gas flow rate: 40 l/h
the balance nitrogen Listed in Table 6 are results obtained by use of various absorbing liquids.

TABLE 6

| | Absorbing liquid | Variation of NO-removing factor (%) with time | | | | | |
|---|---|---|---|---|---|---|---|
| | | after 5 min. | after 30 min. | after 60 min. | after 120 min. | after 180 min. | |
| 1. | 10% sodium acetate<br>2% ferrous sulfate | 58 | 21 | 0 | | | Reference Example |
| 2. | 10% sodium acetate<br>2% ferrous chloride | 62 | 32 | 7 | 0 | | " |
| 3. | 10% calcium acetate<br>2% ferrous chloride | 43 | 16 | 0 | | | " |
| 4. | 10% ammonium acetate<br>2% ferrous sulfate | 58 | 17 | 0 | | | " |
| 5. | 10% sodium propionate<br>2% ferrous sulfate | 38 | 6 | 0 | | | " |
| 6. | 10% sodium acetate<br>2% ferrous sulfate<br>2% sodium sulfite<br>2% acetic acid | 93 | 94 | 92 | 95 | 96 | Example |
| 7. | 10% sodium acetate<br>2% ferrous sulfate<br>4% sodium bisulfite<br>1% acetic acid | 92 | 92 | 91 | 92 | 88 | " |
| 8. | 10% ammonium acetate<br>2% ferrous sulfate<br>2% ammonium sulfite<br>2% acetic acid | 83 | 84 | 88 | 82 | 79 | " |
| 9. | 10% potassium acetate<br>2% ferrous sulfate<br>2% potassium sulfite<br>2% acetic acid | 90 | 90 | 90 | 88 | 90 | " |
| 10. | 10% potassium acetate<br>2% ferrous sulfate<br>4% potassium bisulfite<br>1% acetic acid | 89 | | 85 | | | " |
| 11. | 10% calcium acetate<br>2% ferrous chloride<br>5% calcium bisulfite<br>1% acetic acid | 68 | | | 58 | | " |
| 12. | 10% magnesium acetate<br>2% ferrous sulfate<br>2% magnesium sulfite<br>3% acetic acid | 53 | | | 52 | | " |
| 13. | 10% sodium propionate<br>2% ferrous sulfate<br>2% sodium sulfite<br>3% propionic acid | 73 | | 81 | 79 | | " |
| 14. | 10% sodium acetate<br>2% ferrous sulfate<br>0.1% sodium sulfite<br>1% acetic acid | 88 | | 87 | 86 | | " |
| 15. | 10% sodium acetate<br>2% ferrous sulfate<br>10% sodium sulfite<br>5% acetic acid | 96 | 95 | | 97 | | " |
| 16. | 10% sodium acetate<br>2% ferrous sulfate<br>0.1% sodium bisulfite<br>1% acetic acid | 91 | | 87 | 78 | | " |
| 17. | 10% sodium acetate<br>2% ferrous sulfate<br>10% sodium bisulfite<br>1% acetic acid | 87 | | 88 | 87 | | " |

EXAMPLE 19

By use of an apparatus and method similar to Example 18, a gas containing 350 ppm of NO ($NO_2$; 10%, NO; 90%) and the balance of nitrogen was scrubbed at 55° C at a rate of 40 l/h.

When an absorbing liquid containing 10% of sodium acetate and 2% of ferrous sulfate was used, the NO-removing factor after 60 minutes was 87% and 16% of the removed NO was converted into nitrogen dioxide.

When another absorbing liquid containing 10% of sodium acetate, 2% of ferrous sulfate, 2% of sodium sulfite and 2% of acetic acid was used, the NO-removing factor after 60 minutes was 90% and only less than 1% of the removed NO was converted into nitrogen dioxide.

What is claimed is:

1. An absorbing solution for the removal of nitrogen oxide from a gas containing same by contact with said gas, said absorbing solution having a pH of 4 to 7 and comprising (a) an alkali metal salt, an ammonium salt or an alkaline earth metal salt of an organic acid selected from the group consisting of acetic acid, propionic acid, butyric acid, malonic acid, succinic acid, ethylenediaminetetraacetic acid and nitrilo triacetic acid, (b) an alkali metal sulfite or bisulfite, an ammonia sulfite or bisulfite, or an alkaline earth metal sulfite or bisulfite, and (c) a salt of metal selected from the group consisting of iron, cobalt, nickel, copper and manganese.

2. The absorbing solution as defined in claim 1, wherein said salt of metal is a sulfate, chloride, nitrate, thiocyanate, acetate, propionate, butyrate, malonate, ethylenediaminetetraacetate or nitrilotriacetate.

3. The absorbing solution as defined in claim 1, wherein said alkali metal salt of organic acid is sodium acetate, potassium acetate, sodium propionate, potassium propionate, or sodium ethylenediaminetetraacetate.

4. The absorbing solution as defined in claim 1, wherein said alkaline earth metal salt of organic acid is calcium acetate or magnesium acetate.